US011712801B2

(12) United States Patent
Hane et al.

(10) Patent No.: US 11,712,801 B2
(45) Date of Patent: Aug. 1, 2023

(54) MACHINE LEARNING APPARATUS, ROBOT SYSTEM, AND MACHINE LEARNING METHOD OF LEARNING STATE OF TOOL

(71) Applicant: FANUC CORPORATION, Yamanashi (JP)

(72) Inventors: Mikito Hane, Yamanashi (JP); Takashi Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 250 days.

(21) Appl. No.: 16/903,381

(22) Filed: Jun. 17, 2020

(65) Prior Publication Data
US 2020/0398424 A1   Dec. 24, 2020

(30) Foreign Application Priority Data
Jun. 21, 2019  (JP) .................. 2019-115371

(51) Int. Cl.
| B25J 9/16 | (2006.01) |
| G06N 20/00 | (2019.01) |
| B25J 11/00 | (2006.01) |
| B25J 13/08 | (2006.01) |

(52) U.S. Cl.
CPC ............ B25J 9/163 (2013.01); B25J 9/1633 (2013.01); B25J 11/0065 (2013.01); B25J 13/085 (2013.01); G06N 20/00 (2019.01)

(58) Field of Classification Search
CPC .................................................. B25J 13/085
See application file for complete search history.

(56) References Cited

U.S. PATENT DOCUMENTS

| 9,126,337 | B2 * | 9/2015 | Iwatake | ................. | B25J 9/1694 |
| 9,403,273 | B2 * | 8/2016 | Payton | ................... | B25J 9/1664 |
| 11,167,417 | B2 * | 11/2021 | Takeuchi | ............... | B25J 9/1605 |
| 11,400,556 | B2 * | 8/2022 | Takasu | ............... | B23Q 17/0957 |
| 2005/0159840 | A1 * | 7/2005 | Lin | ................... | G05B 19/4163 |
| | | | | | 700/245 |
| 2018/0361576 | A1 * | 12/2018 | Sakai | ..................... | B25J 9/1694 |
| 2019/0374292 | A1 * | 12/2019 | Barral | .................... | A61B 34/25 |

FOREIGN PATENT DOCUMENTS

| CN | 101612712 A | 12/2009 |
| JP | S59-142048 A | 8/1984 |
| JP | 2003-11080 A | 1/2003 |
| JP | 2003-19643 A | 1/2003 |

(Continued)

Primary Examiner — Jeff A Burke
Assistant Examiner — Christopher A Buksa
(74) Attorney, Agent, or Firm — Hauptman Ham, LLP

(57) ABSTRACT

A machine learning apparatus that can determine the state of a tool from a force applied from the tool to a robot while the robot performs a work using the tool. A machine learning apparatus for learning a state of a tool used for a work by a robot includes a learning data acquisition section that acquires, as a learning data set, data of a force applied from the tool to the robot while the robot causes the tool to perform a predetermined operation, and data indicating the state of the tool during the predetermined operation, and a learning section that generates a learning model representing a correlation between the force and the state of the tool, using the learning data set.

14 Claims, 9 Drawing Sheets

(56) References Cited

FOREIGN PATENT DOCUMENTS

| | | | |
|---|---|---|---|
| JP | 2014-61556 | A | 4/2014 |
| JP | 2017-33526 | A | 2/2017 |
| JP | 2018-024055 | A | 2/2018 |
| JP | 2018-138327 | A | 9/2018 |
| JP | 2018156340 | A | 10/2018 |
| JP | 2019-942 | A | 1/2019 |

* cited by examiner

MACHINE LEARNING APPARATUS, ROBOT SYSTEM, AND MACHINE LEARNING METHOD OF LEARNING STATE OF TOOL

RELATED APPLICATIONS

The present application claims priority to Japanese Application Number 2019-115371, filed Jun. 21, 2019, the disclosure of which is hereby incorporated by reference herein in its entirety.

BACKGROUND OF THE INVENTION

1. Field of the Invention

The invention relates to a machine learning apparatus, a robot system, and a machine learning method for learning the state of a tool used for a work by a robot.

2. Description of the Related Art

A technique for learning the characteristics of a sound or vibration while a workpiece is machined by a tool, and determining the degree of deterioration of the tool is known (Japanese Unexamined Patent Publication (Kokai) No. 2018-156340).

In the field of robotics, a force applied from a tool to a robot is detected while the robot performs a work using the tool. A demand has arisen for a technique for determining the state of the tool from the thus detected force.

SUMMARY OF THE INVENTION

In an aspect of the disclosure, a machine learning apparatus configured to learn a state of a tool used for a work by a robot includes a learning data acquisition section configured to acquire, as a learning data set, data of a force applied from the tool to the robot while the robot causes the tool to perform a predetermined operation, and data indicating the state of the tool during the predetermined operation; and a learning section configured to generate a learning model representing a correlation between the force and the state of the tool, using the learning data set.

In another aspect of the disclosure, a machine learning method of learning a state of a tool used for a work by a robot includes, by a processor, acquiring, as a learning data set, data of a force applied from the tool to the robot while the robot causes the tool to perform a predetermined operation, and data indicating the state of the tool during the predetermined operation; and generating a learning model representing a correlation between the force and the state of the tool, using the learning data set.

According to the disclosure, a model quantitatively representing a correlation between the force applied from a tool to a robot and the state of the tool while the robot causes the tool to perform a predetermined operation can be automatically and accurately obtained.

DETAILED DESCRIPTION

Figure 1:
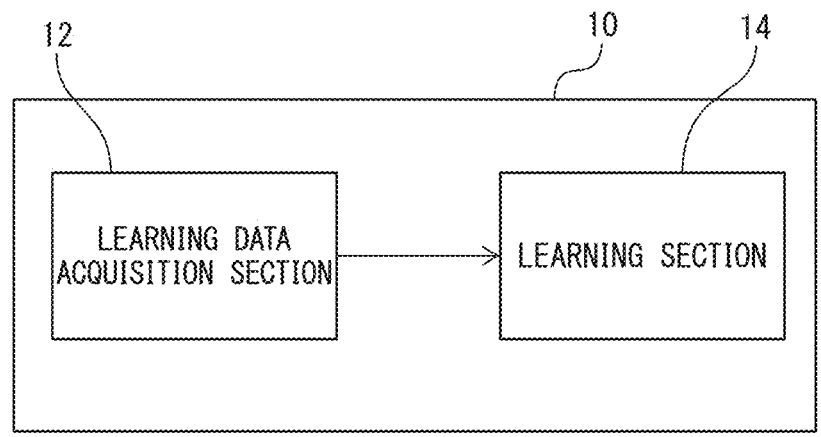
FIG. 1 is a block diagram illustrating a machine learning apparatus according to one embodiment.

Embodiments of the disclosure will be described in detail below with reference to the drawings. In various embodiments to be set forth below, same elements are assigned the same reference numerals, and repetitive descriptions thereof will be omitted. First, with reference to FIG. 1, a machine learning apparatus 10 according to an embodiment will be described. The machine learning apparatus 10 may be comprised of a computer including e.g. a processor (CPU, GPU, etc.), a storage (ROM, RAM, etc.), and an input device (keyboard, mouse, touch panel, etc.), or comprised of software such as a learning algorithm.

Figure 2:
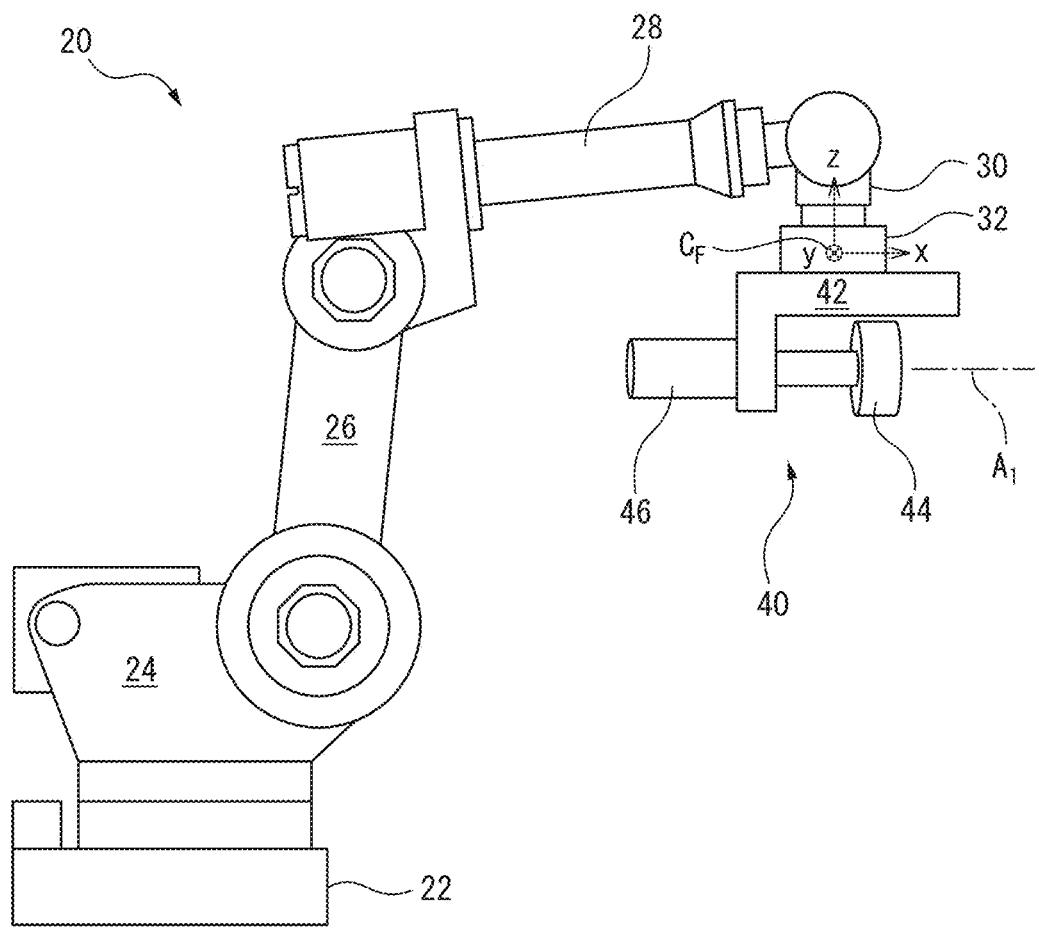
FIG. 2 illustrates the state in which an end effector is mounted on a robot according to one embodiment.

The machine learning apparatus 10 learns a state (e.g., a normal state or abnormal state) of a tool used for a work by a robot 20 described below. In FIGS. 2 to 7, the robot 20 and various end effectors mounted at the robot 20 are illustrated. As illustrated in FIG. 2, the robot 20 is a vertical multi-articulated robot, and includes a base 22, a rotating body 24, a lower arm 26, an upper arm 28, and a wrist 30.

The base 22 is fixed on a floor of a work cell. The rotating body 24 is mounted at the base 22 so as to be rotatable about a vertical axis. The lower arm 26 is mounted at the rotating body 24 so as to be rotatable about a horizontal axis. The upper arm 28 is rotatably mounted at a distal end of the lower arm 26. The wrist 30 is rotatably mounted at a distal end of the upper arm 28.

In the example illustrated in FIG. 2, an end effector 40 for polishing a workpiece is detachably attached to a distal end of the wrist 30. The wrist 30 rotatably supports the end effector 40. A plurality of servomotors (not illustrated) are built in the robot 20, and drive movable elements (i.e., the rotating body 24, the lower arm 26, the upper arm 28, and the wrist 30) of the robot 20 so as to arrange the end effector 40 at an arbitrary position and posture.

The end effector 40 includes a base 42, a tool 44 provided at the base 42 so as to be rotatable about an axis $A_1$, and a driving section 46 configured to rotate the tool 44. The base 42 is connected to the distal end of the wrist 30. The tool 44 is e.g. a cylindrical polishing material containing a polishing abrasive grain (e.g., ceramic, zirconia, or diamond), and polishes the workpiece by its rotation operation. The driving section 46 is e.g. a servomotor, and rotates the tool 44 about the axis $A_1$.

A force sensor 32 is interposed between the wrist 30 and the end effector 40. The force sensor 32 is e.g. a six-axis force sensor including a plurality of strain gauges, and detects a force acting on the force sensor 32. More specifically, the force sensor 32 outputs from each strain gauge an output signal $S_o$ in response to a strain generated in the force sensor 32.

Based on these output signals $S_o$, it is possible to detect forces $F_x$, $F_y$, $F_z$, $M_x$, $M_y$, and $M_z$ in six directions of a force sensor coordinate system $C_F$, i.e., the force $F_x$ in the x-axis direction, the force $F_y$ in the y-axis direction, the force $F_z$ in the z-axis direction, the moment $M_x$ about the x-axis, the moment $M_y$ about the y-axis, and the moment $M_z$ about the z-axis of the force sensor coordinate system $C_F$.

From the forces $F_x$, $F_y$, $F_z$, $M_x$, $M_y$, and $M_z$ in the six directions, the magnitude and the direction of a force Fe applied to the end effector 40 (e.g., the tool 44) can be detected. For example, the force sensor coordinate system $C_F$ is set for the force sensor 32 such that its origin is arranged at a predetermined position (e.g., the center) of the force sensor 32, and its z-axis direction is parallel to the central axis of the force sensor 32.

Figure 3:
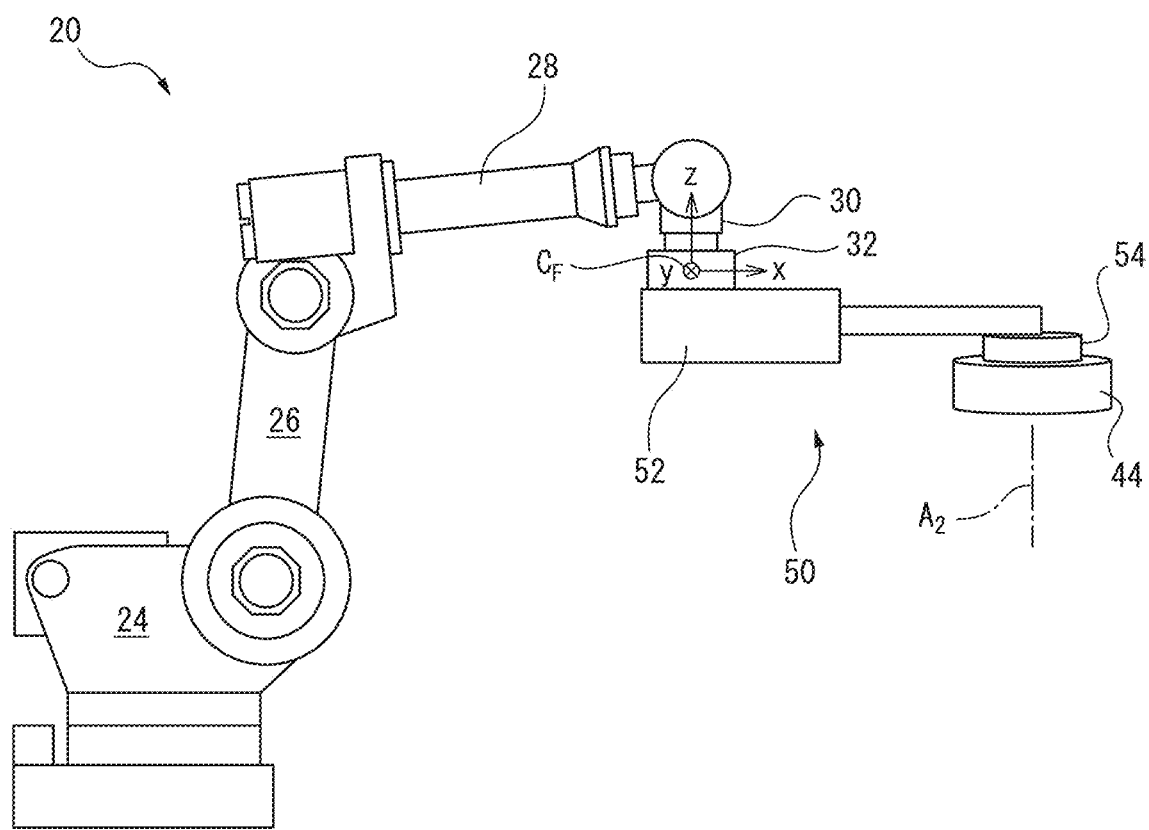
FIG. 3 illustrates the state in which another end effector is mounted on the robot illustrated in FIG. 2.

In the example illustrated in FIG. 3, another end effector 50 for polishing a workpiece is attached to the wrist 30 of the robot 20. The end effector 50 includes a base 52, the tool 44 provided at the base 52 so as to be rotatable about an axis $A_2$, and a driving section 54 configured to rotates the tool 44.

The base 52 is mounted at the distal end of the wrist 30 via the force sensor 32. The driving section 54 is e.g. a servomotor, and rotates the tool 44 about the axis $A_2$. In the examples illustrated in FIGS. 2 and 3, the robot 20 performs a work for polishing the workpiece, using the tool 44.

Figure 4:
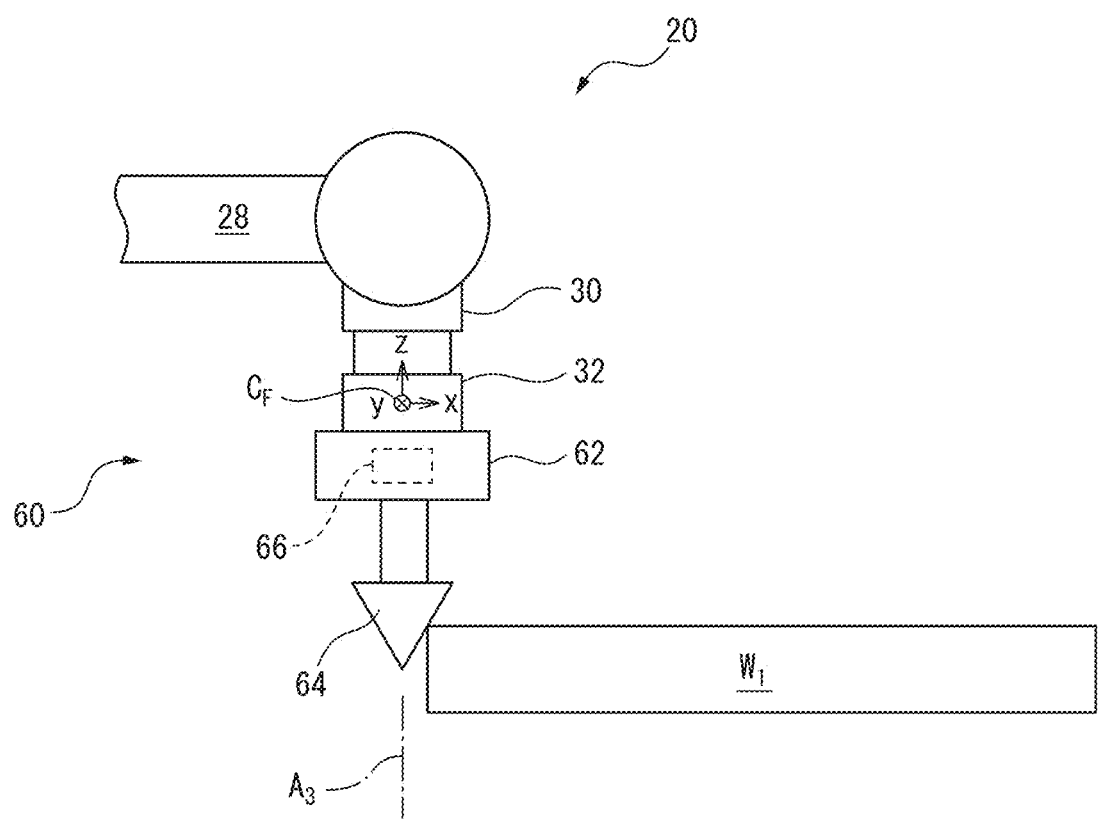
FIG. 4 illustrates the state in which still another end effector is mounted on the robot illustrated in FIG. 2.

In the example illustrated in FIG. 4, an end effector 60 for machining (e.g., burring) a workpiece $W_1$ is detachably attached to the wrist 30 of the robot 20. More specifically, the end effector 60 includes a base 62, a tool 64 provided at the base 62 so as to be rotatable about an axis $A_3$, and a driving section 66 configured to rotate the tool 64. The base 62 is mounted at the distal end of the wrist 30 via the force sensor 32.

The tool 64 is a machining tool made of e.g. steel, and having a substantially conical distal end. The tool 64 machines the workpiece $W_1$ by its rotation operation. The driving section 66 is a device that generates power by e.g. a motor or a compressed gas, and is built in the base 62. The driving section 66 rotates the tool 64 about the axis $A_3$. The robot 20 performs a work for machining (e.g., burring) the workpiece, using the tool 64.

Figure 5:
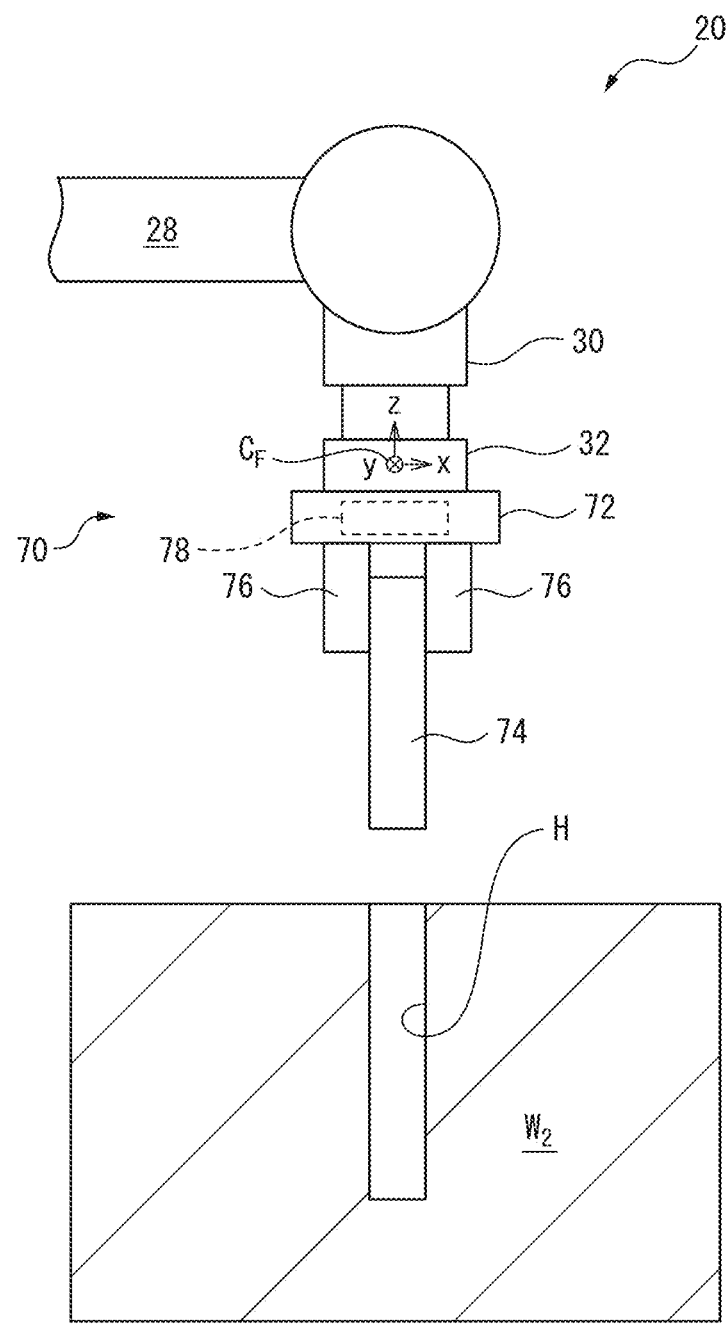
FIG. 5 illustrates the state in which still another end effector is mounted on the robot illustrated in FIG. 2.

In the example illustrated in FIG. 5, an end effector 70 is detachably attached to the wrist 30 of the robot 20. The end effector 70 is a robot hand that handles a tool 74, and includes a base 72, a plurality of fingers 76 provided at the base 72 so as to open and close, and a driving section 78 configured to drive the fingers 76.

The base 72 is mounted at the distal end of the wrist 30 via the force sensor 32. The fingers 76 are provided at the base 72 to be movable in directions towards and away from each other, and grip or release the tool 74. The driving section 78 is e.g. a servomotor or cylinder, and is built in the base 72.

Figure 6:
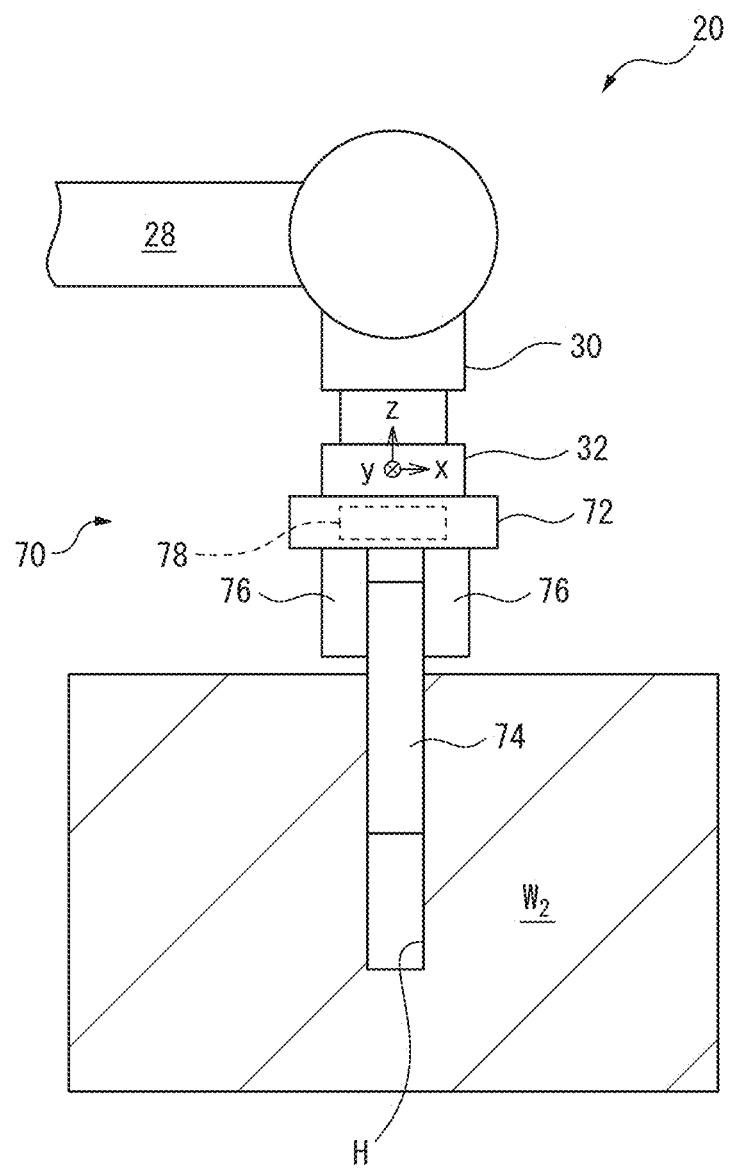
FIG. 6 illustrates the state in which a tool gripped by the robot illustrated in FIG. 5 is inserted into a hole.

The tool 74 is a cylindrical or prismatic member (e.g., an automobile cylinder). The robot 20 grips the tool 74 by the end effector 70, and performs a work for inserting the gripped tool 74 into a hole H formed in a target workpiece $W_2$ so as to fit the tool 74 to the workpiece $W_2$, as illustrated in FIG. 6.

Referring back to FIG. 1, the machine learning apparatus 10 includes a learning data acquisition section 12 and a learning section 14. The learning data acquisition section 12 acquires, as a learning data set, data of a force F applied from the tool 44, 64 or 74 to the robot 20 while the robot 20 causes the tool 44, 64 or 74 to perform a predetermined operation, and data indicating a state S of the tool 44, 64 or 74 during the predetermined operation.

In the examples illustrated in FIGS. 2 to 4, the "predetermined operation" is e.g. an operation to rotate the tool 44 or 64 by the robot 20 without contacting the tool 44 or 64 with the workpiece. Alternatively, the "predetermined operation" is an operation to rotate the tool 44 or 64 by the robot 20 along with contacting the tool 44 or 64 with the workpiece. Note that, when the robot performs the operation to rotate the tool 44 or 64 along with contacting the tool 44 or 64 with the workpiece as the predetermined operation, the robot 20 may carry out force control for controlling the force F applied from the tool 44 or 64 to the robot 20 (i.e., the force applied from the tool 44 or 64 to the workpiece) to a predetermined target value.

On the other hand, in the example illustrated in FIG. 5, the "predetermined operation" is an operation to insert the tool 74 into the hole H by the robot 20. Note that, when the robot 20 performs the operation to insert the tool 74 into the hole H as the predetermined operation, the robot 20 may carry out force control for controlling the force F applied from the tool 74 to the robot 20 (i.e., the force applied from the tool 74 to the workpiece $W_2$) to a predetermined target value.

As stated above, various end effectors such as the end effector 40, 50, 60 or 70 are mounted at the wrist 30 of the robot 20 depending on the works, and the robot 20 causes the tool 44, 64 or 74 to perform the above-described predetermined operation. The force sensor 32 detects the force F applied from the tool 44, 64 or 74 to the robot 20 while the robot 20 causes the tool 44, 64 or 74 to perform the predetermined operation, and provides data of the force F to the learning data acquisition section 12.

In the examples illustrated in FIGS. 2 to 4, while the robot 20 performs, as the predetermined operation, the operation to rotate the tool 44 or 64 without contacting the tool 44 or 64 with the workpiece (or along with contacting the tool 44 or 64 with the workpiece), a force is applied to the force sensor 32 by the rotation of the tool 44 or 64. The force sensor 32 detects such a force as the force F applied from the tool 44 or 64 to the robot 20 during the predetermined operation.

In the example illustrated in FIG. 5, while the robot 20 performs the operation to inserting the tool 74 into the hole H as the predetermined operation, a force due to this operation is applied to the force sensor 32. The force sensor 32 detects such a force as the force F applied from the tool 74 to the robot 20 during the predetermined operation. The learning data acquisition section 12 acquires from the force sensor 32 the data of the force F detected by the force sensor 32. The data of the force F includes at least one of the output signal $S_o$, the forces $F_x$, $F_y$, $F_z$, $M_x$, $M_y$, and $M_z$, and the force $F_E$ applied to the end effector 40.

Further, the data of the force F may include at least one of a time-change characteristics CT, an amplitude value AP (e.g., a positive or negative peak value or a peak-to-peak value), and a frequency spectrum FS of the data $S_o$, $F_x$, $F_y$, $F_z$, $M_x$, $M_y$, $M_z$, or $F_E$. The time-change characteristics CT or the frequency spectrum FS may be data detected over a predetermined time τ. The amplitude value AP may be the average or the maximum value for the predetermined time τ. The predetermined time τ may be the time from the start to the end of the "predetermined operation" performed by the robot 20, or may be an arbitrary time (e.g., 1 sec) during the "predetermined operation."

The data indicating the state S of the tool 44, 64 or 74 includes e.g. label information such as "normal state" or "abnormal state." The abnormal state indicates a state in which the tool 44, 64 or 74 has damage such as chipping, fractures, or cracking, for example. On the other hand, the normal state indicates a state in which the tool 44, 64 or 74 has no damage.

As the label information of the "normal state," a plurality of pieces of label information such as "brand-new condition" and a "secondhand condition" may be set. Further, as the label information of the "abnormal state," a plurality of pieces of label information, such as "abnormal state level 1," "abnormal state level 2," and "abnormal state level 3," may be set depending on the seriousness of the abnormal state.

The data indicating the state S of the tool 44, 64 or 74 is determined by an operator. For example, the operator confirms the state (normal state, abnormal state) of the tool 44, 64 or 74 by e.g. visual observation, and inputs the data indicating the state S of the tool 44, 64 or 74 to the learning data acquisition section 12.

Alternatively, the operator may preliminary provide a learning model LM2 representing a correlation between image data of the tool 44, 64 or 74 and the state S of the tool 44, 64 or 74, and input to the learning model LM2 the image data obtained by imaging the tool 44, 64 or 74, in order to determine the state S of the tool 44, 64 or 74. The learning data acquisition section 12 acquires, as a learning data set DS, the data of the force F acquired from the force sensor 32, and the data indicating the state S determined by the operator (or the learning model LM2).

There is a correlation between the force F applied from the tool 44, 64 or 74 to the robot 20 while the robot 20 causes the tool 44, 64 or 74 to perform the predetermined operation, and the state S (e.g., the normal state or abnormal state) of the tool 44, 64 or 74. In the examples illustrated in FIGS. 2 to 4, assume that the tool 44 or 64 has damage.

If the robot 20 performs the predetermined operation to rotate the tool 44 or 64 in such a case, decentering may occur in rotation of the tool 44 or 64 due to the damage, and as a result, the force F applied from the tool 44 or 64 to the robot 20 may be different when compared with a case where the tool 44 or 64 having no damage is rotated.

Further, in the examples illustrated in FIGS. 5 and 6, assume that the tool 74 has damage. If the robot 20 performs the predetermined operation to insert the tool 74 into the hole H in such a case, the force F applied from the tool 74 to the robot 20 may be different when compared with a case where the tool 74 having no damage is inserted into the hole H, because of a friction between the damaged portion of the tool 74 and the wall surface defining the hole H.

The learning section 14 generates a learning model (function) LM representing a correlation between the force F and the state S, using the learning data set DS of the force F and the state S. For example, the learning section 14 generates the learning model LM by carrying out supervised learning. In this case, the robot 20 is caused to repeat trials of the predetermined operation, every time another tool 44, 64 or 74 is attached to the robot 20. The learning data acquisition section 12 repeatedly acquires the learning data set DS as teacher data, every time the robot 20 performs the predetermined operation.

The learning section 14 learns the learning model LM by identifying a feature implying the correlation between the data (the time-change characteristics, the frequency spectrum, etc.) of the force F and the data (label information such as the normal state or the abnormal state) indicating the state S acquired as the teacher data. As such supervised learning, an algorithm such as Support Vector Machine (SVM) or Gaussian Mixture Model (GMM) can be employed.

Below, with reference to FIG. 7, the flow of a learning cycle executed by the machine learning apparatus 10 will be described. In step S1, the operator attaches the tool 44, 64 or 74 (i.e., the end effector 40, 50, 60 or 70) to the robot 20, and causes the tool 44, 64 or 74 to perform the predetermined operation by the robot 20.

In step S2, the learning data acquisition section 12 acquires the learning data set DS. More specifically, the learning data acquisition section 12 acquires from the force sensor 32 the data of the force F detected by the force sensor 32 while the robot 20 causes the tool 44, 64 or 74 to perform the predetermined operation in step S1.

Further, the learning data acquisition section 12 acquires the label information of the normal state or the label information of the abnormal state, as the data indicating the state S of the tool 44, 64 or 74 rotated in step S1. As an example, the operator confirms whether the tool 44, 64 or 74 is in the normal state or the abnormal state by visually observing the tool 44, 64 or 74 before performing the predetermined operation in step S1.

As another example, the operator confirms whether the tool 44, 64 or 74 is in the normal state or the abnormal state by confirming the data of the force F detected by the force sensor 32 during the predetermined operation in step S1. The operator operates the input device of the machine learning apparatus 10 so as to input the label information of the normal state or the label information of the abnormal state as the data indicating the state S of the tool 44, 64 or 74 attached in step S1.

As still another example, the tool 44, 64 or 74 is imaged by a camera (not illustrated) before or after performing the predetermined operation in step S1. The captured image data is input to the learning model LM2. The learning model LM2 outputs the label information of the normal state or the label information of the abnormal state to the learning data acquisition section 12.

The learning data acquisition section 12 acquires the input label information of the normal state or the input label information of the abnormal state. In this manner, the learning data acquisition section 12 acquires the learning data set DS of the data of the force F and the data indicating the state S, and stores them in the storage so as to be associated with each other.

In step S3, the learning section 14 generates the learning model LM representing the correlation between the force F and the state S, using the learning data set DS acquired in step S2. More specifically, the learning section 14 learns the learning model LM by executing the supervised learning algorithm (e.g., SVM or GMM).

Then, the process returns to step S1, and the operator attaches another tool 44, 64 or 74 (i.e., the end effector 40, 50, 60 or 70) to the robot 20, and then, the robot 20 performs the predetermined operation using this tool 44, 64 or 74. The learning data acquisition section 12 acquires the Learning data set DS for this tool 44, 64 or 74 in step S2, and the learning section 14 updates the learning model LM using the newly acquired learning data set DS in step S3.

By executing such a learning cycle, learning of the learning model LM is advanced, whereby the learning model LM is guided to an optimum solution. Such a learning cycle is carried out for each of the tools 44, 64 and 74, whereby it is possible to acquire the learning model LM representing the correlation between the force F and the state S of the tool 44, 64, 74, for each of the tools 44, 64 and 74.

According to this embodiment, it is possible to automatically and accurately obtain a model quantitatively representing the correlation between the force F and the state S of the tool. The invention is not limited to the flow of the learning cycle illustrated in FIG. 7. For example, the loop of steps S1 and S2 may be repeatedly carried out in order to acquire a large number of learning data sets DS, and subsequently, step S3 may be executed, and the learning section 14 may learn the learning model LM using the large number of learning data sets DS.

As another function of the machine learning apparatus 10, in step S2, the learning data acquisition section 12 may further acquire, as the learning data set DS, data of the position and posture of the tool 44, 64 or 74 while the robot 20 performs the predetermined operation in step S1. More specifically, in step S1, the robot 20 causes the tool 44, 64 or 74 to perform the predetermined operation while the robot 20 arranges the tool 44, 64 or 74 at a predetermined position and posture.

In step S2, the learning data acquisition section 12 acquires a rotation angle θ of each servomotor of the robot 20 from an encoder (not illustrated) configured to detect the rotation angle θ, when the tool 44, 64 or 74 is arranged at the predetermined position and posture in step S1. From the rotation angles θ, the position and posture of the tool 44, 64 or 74 (or the end effector 40, 50, 60 or 70) can be calculated.

In this step S2, the learning data acquisition section 12 acquires, as the learning data set DS, data of the position and posture of the tool 44, 64 or 74, in addition to the data of the force F and the data indicating the state S. Note that the learning data acquisition section 12 may acquire the rotation angle θ as the data of the position and posture. In step S3, the learning section 14 generates the learning model LM using the learning data set DS of the data of the force F, the data of the state S, and the data of the position and posture.

The technical significance for acquiring the data of the position and posture as the learning data set DS will be described below. The force F detected by the force sensor 32 while the robot 20 performs the predetermined operation varies depending on the position and posture of the tool 44, 64 or 74. Therefore, by generating the learning model LM by adding a relationship between the force F and the position and posture of the tool 44, 64 or 74, it is possible to acquire the learning model LM representing the correlation between the force F and the state S when the predetermined operation is performed while the tool 44, 64 or 74 is arranged at various positions and postures.

As still another function of the machine learning apparatus 10, if the tool 44 or 64 is used, in step S2, the learning data acquisition section 12 may further acquire, as the learning data set DS, data of the rotation speed of the tool 44 or 64 while the robot 20 performs the predetermined operation in step S1.

More specifically, while the robot 20 performs the predetermined operation to rotate the tool 44 or 64 in step S1, the learning data acquisition section 12 acquires data of a rotation speed V from a speed sensor (not illustrated) configured to detect the rotation speed of the tool 44 or 64.

Alternatively, the learning data acquisition section 12 may acquire data of a speed command CR transmitted to the end effector 40, 50 or 60 while the robot 20 causes the tool 44 or 64 to perform the predetermined operation in step S1. The speed command CR is a command that defines the rotation speed of the tool 44 or 64 during the predetermined operation.

On the other hand, if the tool 74 is used, in step S2, the learning data acquisition section 12 may further acquire, as the learning data set DS, data of the operation speed of the tool 74 (i.e., the speed at which the tool 74 is moved to the hole H) while the robot 20 performs the predetermined operation in step S1. More specifically, the learning data acquisition section 12 acquires an operation speed V from a speed sensor (not illustrated) configured to detect the operation speed of the tool 74 while the robot 20 performs the predetermined operation to insert the tool 74 into the hole H in step S1.

Alternatively, the learning data acquisition section 12 may acquire data of a speed command CR transmitted to the end effector 70 while the robot 20 causes the tool 74 to perform the predetermined operation in step S1. The speed command CR is a command that defines the operation speed of the tool 74 during the predetermined operation.

In this manner, in step S2, the learning data acquisition section 12 acquires, as the learning data set DS, the data of the speed V (or the speed command CR) of the tool 44, 64 or 74, in addition to the data of the force F and the data indicating the state S. In step S3, the learning section 14 generates the learning model LM using the learning data set DS of the data of the force F, the data of the state S, and the data of the speed V (or the speed command CR).

The force F detected by the force sensor 32 while the robot 20 performs the predetermined operation varies depending on the speed V of the tool 44, 64 or 74. Therefore, by generating the learning model LM by adding a relationship between the force F and the speed V (or the speed command CR) of the tool 44, 64 or 74, it is possible to acquire the learning model LM corresponding to the speed V.

As still another function of the machine learning apparatus 10, in step S2, the learning data acquisition section 12 may further acquire, as the learning data set DS, data of a weight WG of the tool 44, 64 or 74. More specifically, the learning data acquisition section 12 acquires the data of the weight. WG from a weight sensor (not illustrated) configured to detect the weight of the tool 44, 64 or 74, before or after performing the predetermined operation in step S1.

In this manner, in step S2, the learning data acquisition section 12 acquires, as the learning data set DS, the data of the weight WG of the tool 44, 64 or 74, in addition to the data of the force F and the data indicating the state S. In step S3, the learning section 14 generates the learning model LM using the learning data set DS of the data of the force F, the data of the state S, and the data of the weight WG.

The force F detected by the force sensor 32 while the robot 20 performs the predetermined operation varies depending on the weight WG of the tool 44, 64 or 74. Therefore, by generating the learning model LM by adding a relationship between the force F and the weight WG of the tool 44, 64 or 74, it is possible to acquire the learning model LM corresponding to the weight WG.

As still another function of the machine learning apparatus 10, in step S2, the learning data acquisition section 12 may further acquire, as the learning data set DS, data of the type of workpiece W to be worked by the tool 44, 64 or 74. The data of the type of workpiece W includes e.g. information of a specification of the workpiece w such as the material, the roughness, or the modulus of rigidity thereof, or information for identifying the type of workpiece W.

The information of the specification of the workpiece W may include characters (e.g., "iron," "aluminum," or "SUS3044") or numerical values. The information for identifying the type of workpiece W may be character information such as "Workpiece Type A" or "Workpiece Type B," or may be an identification number assigned to each workpiece W by the operator.

In step S2, the operator may operate the input device of the machine learning apparatus 10 so as to input data of the type of workpiece W. In this manner, in step S2, the learning data acquisition section 12 acquires, as the learning data set DS, the data of the type of workpiece W, in addition to the data of the force F and the data indicating the state S. In step S3, the learning section 14 generates the learning model LM using the learning data set DS of the data of the force F, the data of the state S, and the data of the type of workpiece W.

The force F detected by the force sensor 32 while the robot 20 performs the predetermined operation varies depending on the data of the type of workpiece W. For example, if the robot 20 performs the predetermined operation to rotate the tool 44 or 64 along with contacting the tool 44 or 64 with the workpiece W in step S1, or if the robot 20 performs the predetermined operation to insert the tool 74 into the hole H in step S1, the force applied from the workpiece W to the tool 44, 64 or 74 may vary depending on e.g. the material, the roughness, or the modulus of rigidity of the workpiece W.

Therefore, by generating the learning model LM by adding a relationship between the force F and the type of workpiece W, it is possible to acquire the learning model LM corresponding to the type of workpiece W. Note that the learning data acquisition section 12 may further acquire, as the learning data set DS, data of the type of tool 44, 64 or 74 (e.g., character information for identifying the type of tool).

The tool 44, 64 or 74 has a known life period T in which the state S changes with time. The life period T may be predetermined to be e.g. one month or one year, as the specification of the tool 44, 64 or 74. When such a life period T is given, the learning section 14 may generate the learning model LM for each of a plurality of sub-periods included in the life period T.

For example, the lire period T is divided into a sub-period $T_1$ from a time point $t_0$ at which the tool 44, 64 or 74 is brand-new to a time point $t_1$ after the tool 44, 64 or 74 is used for a predetermined time from the time point $t_0$, a sub-period $T_2$ from the time point $t_1$ to a time point $t_2$ after the tool 44, 64 or 74 is used for a predetermined time from the time point $t_1$, . . . a sub-period $T_n$ from a time point $t_{n-1}$ to a time point $t_n$ after the tool 44, 64 or 74 is used for a predetermined time from the time point $t_{n-1}$.

Figure 7:
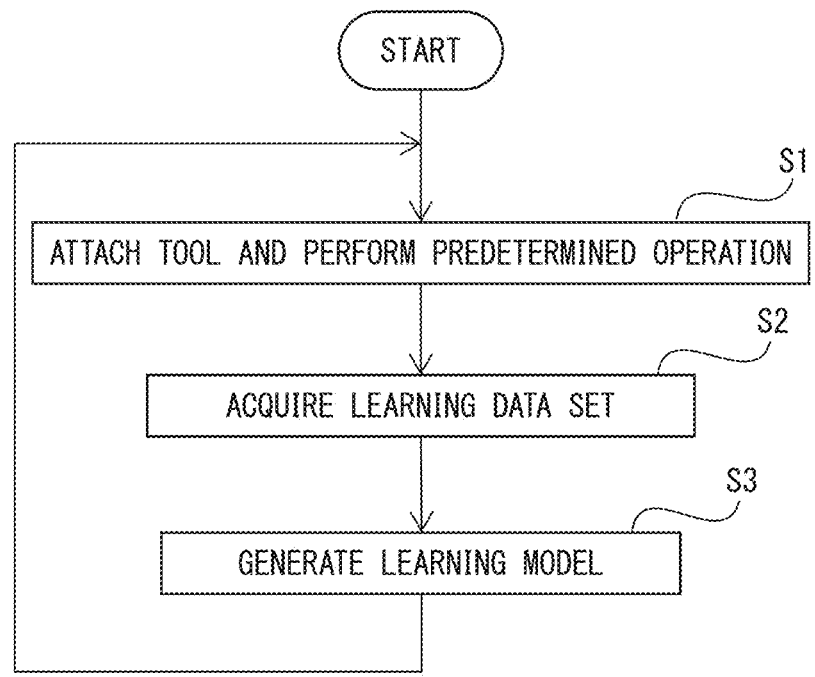
FIG. 7 is a flowchart illustrating an exemplary learning cycle executed by the machine learning apparatus illustrated in FIG. 1.

In this case, the learning section 14 may generate a learning model $LM_n$ for each sub-period $T_n$ (n=1, 2, 3, . . . , n) by executing the learning cycle illustrated in FIG. 7 for each sub-period $T_n$. According to this configuration, it is possible to generate the learning model LM corresponding to the usage period of the tool 44, 64 or 74.

Figure 8:
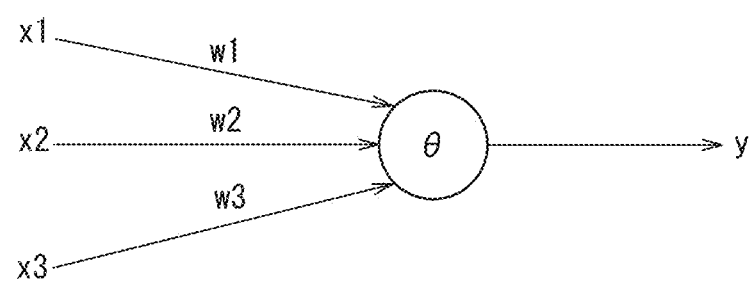
FIG. 8 schematically illustrates a model of a neuron.
Figure 9:
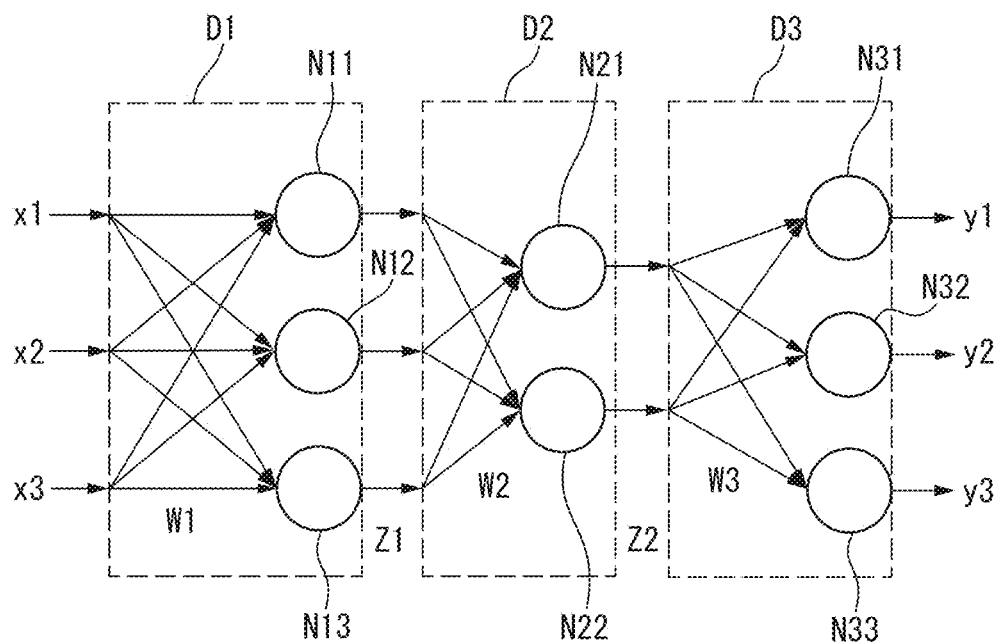
FIG. 9 schematically illustrates a model of a multilayer neural network.

Note that the learning algorithm executed by the learning section 14 is not limited to the supervised learning, but a known learning algorithm such as unsupervised learning, reinforcement learning, or a neural network can be employed as machine learning. As an example, FIG. 8 schematically illustrates a model of a neuron. FIG. 9 schematically illustrates a model of a three-layer neural network formed by combining neurons as illustrated in FIG. 8 together. FIG. 8 illustrates three inputs x as an example, but the number of inputs x may be n (n is a positive number of two or four or more). FIG. 9 illustrates a model of a three-layer neural network as an example, but a neural network of n layers (n is a positive number of two or four or more) may be used. The neural network can be comprised of an arithmetic device or a storage device imitating a model of a neuron.

The neuron illustrated in FIG. 8 outputs a result y in response to inputs x (inputs x1 to x3 are defined as an example in FIG. 8). The individual inputs x (x1, x2, and x3) are respectively multiplied by weights w (w1, w2, and w3). The relationship between the inputs x and the result y can be expressed as the following equation:

$$y = f_k(\Sigma_{i=1}^{n} x_1 w_1 - \theta) \quad (1)$$

The inputs x, the result y, and the weights w are all vectors. Further, in equation (1), $\theta$ is a bias, and $f_k$ is an activation function.

In the three-layer neural network illustrated in FIG. 9, inputs x (inputs x1 to x3 are defined as an example in FIG. 9) are input from the left side, and results y (results y1 to y3 are defined as an example in FIG. 9) are output from the right side. In the example illustrated in FIG. 9, each of the inputs x1, x2, and x3 is multiplied by a corresponding weight (collectively denoted by W1), and all the individual inputs x1, x2, and x3 are input to three neurons N11, N12, and N13.

In FIG. 9, the output of each of the neurons N11 to N13 is collectively denoted by Z1. Z1 can be considered as a feature vector obtained by extracting a feature amount of an input vector. In the example illustrated in FIG. 9, each feature vector Z1 is multiplied by a corresponding weight (collectively denoted by W2), and all the individual feature vectors Z1 are input to two neurons N21 and N22. The feature vectors Z1 represent features between the weight W1 and the weight W2.

In FIG. 9, the output of each of the neurons N21 and N22 is collectively denoted by Z2. Z2 can be considered as a feature vector obtained by extracting a feature amount of the feature vector Z1. In the example illustrated in FIG. 9, each feature vector Z2 is multiplied by a corresponding weight (collectively denoted by W3), and all the individual feature vectors Z2 are input to three neurons N31, N32, and N33.

The feature vectors Z2 represent features between the weight W2 and the weight W3. Lastly, the neurons N31 to N33 output the results y1 to y3, respectively. The machine learning apparatus 10 can learn the learning model LM by performing multilayer structure calculation in accordance with the above-mentioned neural network, using the learning data set DS as the input.

The configuration of the machine learning apparatus 10 can be described as a machine learning method (or software) executed by a processor of a computer. The machine learning method comprises acquiring, as the learning data set DS, the data of the force F applied from the tool 44, 64 or 74 to the robot 20 while the robot 20 causes the tool 44, 64 or 74 to perform the predetermined operation, and the data indicating the state S of the tool 44, 64 or 74 during the predetermined operation; and generating the learning model LM representing the correlation between the force F and the state S of the tool 44, 64 or 74, using the learning data set DS.

Next, with reference to FIG. 10, a robot system 100 according to an embodiment will be described. The robot system 100 includes the robot 20, the force sensor 32, and a controller 102. The controller 102 includes a processor 104 and a storage 106. The processor 104 and the storage 106 are communicably connected to each other via a bus 108, and the processor 104 includes e.g. a CPU or GPU, and executes various arithmetic processes while communicating with the storage 106.

In this embodiment, the machine learning apparatus 10 is installed in the controller 102 as hardware or software, and the processor 104 executes various arithmetic processes for carrying out the function of the machine learning apparatus 10. Thus, in this embodiment, the processor 104 functions as the learning data acquisition section 12 and the learning section 14. The storage 106 includes e.g. a ROM and RAM, and pre-stores the learning model LM learned by the machine learning apparatus 10.

Figure 11:
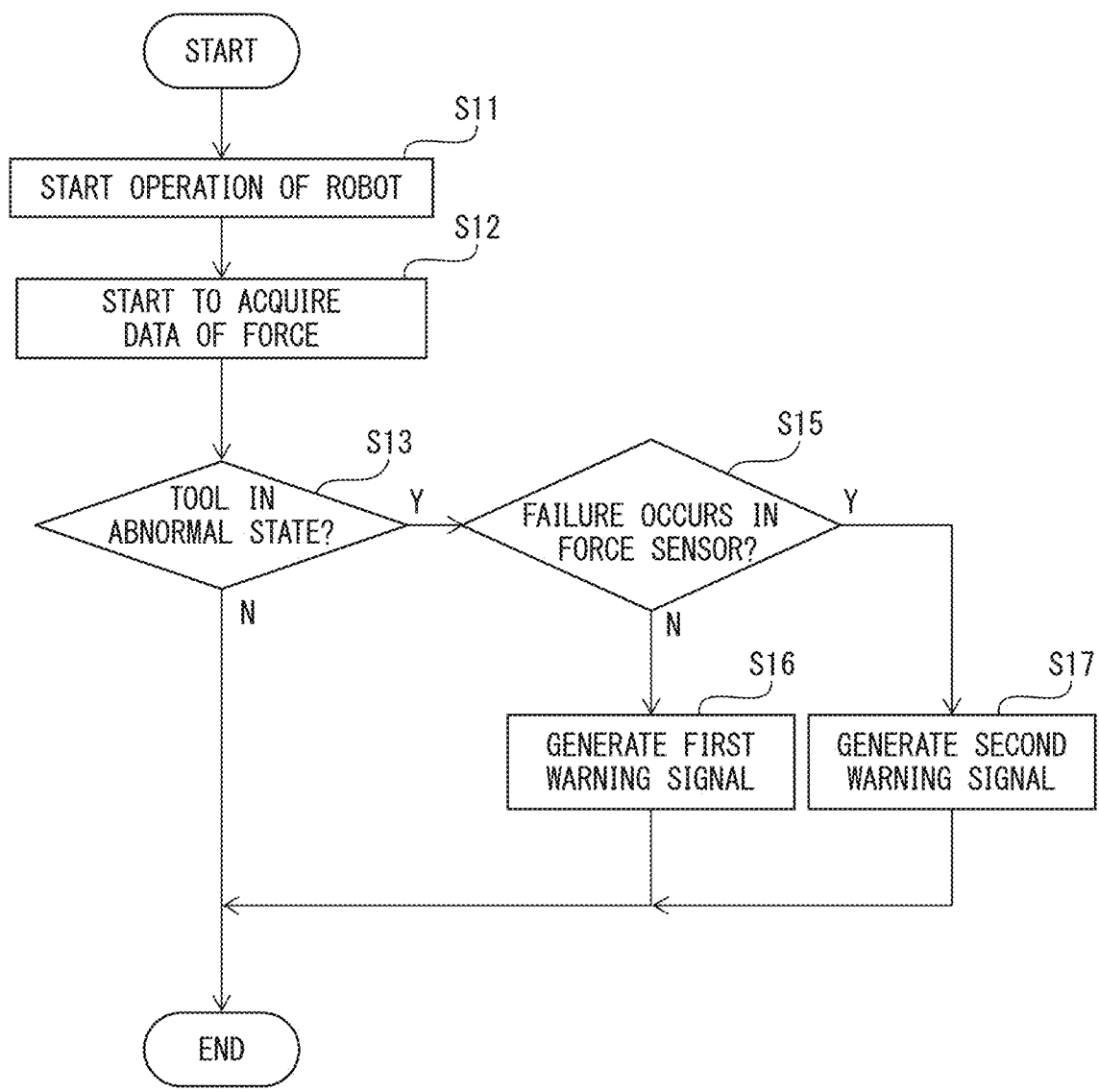
FIG. 11 is a flowchart illustrating an exemplary operation sequence of the robot system illustrated in FIG. 10.

The operation of the robot system 100 will be described below with reference to FIG. 11. The flow illustrated in FIG. 11 is started when the processor 104 receives a work-start-command from an operator, a host controller, or an operation program. In step S11, the processor 104 starts an operation of the robot 20. In this step S11, the processor 104 causes the robot 20 to perform an operation the same as the "predetermined operation" that has been performed at the learning stage of the learning model LM.

In the examples illustrated in FIGS. 2 to 4, the processor 104 causes the robot 20 to perform the operation to rotate the tool 44 or 64 without (or along with) contacting the tool 44 or 64 with the workpiece. In the examples illustrated in FIGS. 5 and 6, the processor 104 causes the robot 20 to perform the operation to insert the tool 74 gripped by the end effector 70 into the hole H. In this respect, the processor 104 may perform the above-mentioned force control during the operation to rotate the tool 44 or 64 along with contacting the tool 44 or 64 with the workpiece, or the operation to insert the tool 74 into the hole H.

Note that, the "same operation" to be performed in this step S11 may not necessarily be an operation under completely the same conditions (e.g., the type of tool, the type of workpiece, the type of robot 20, the position and posture of the robot 20, and the movement path of the robot 20) as the "predetermined operation" performed at the learning stage of the learning model LM, but may include an operation in which at least one of the conditions is different from the "predetermined operation."

In step S12, the processor 104 starts to acquire data of a force F. More specifically, the processor 104 starts to acquire from the force sensor 32 the data of the force F detected by the force sensor 32 during the operation in step S11. The processor 104 may acquire the data of the force F over a predetermined time t during the operation in step S11.

The predetermined time τ may be the time from the start to the end of the operation performed by the robot 20 in step S11, or may be an arbitrary time (e.g., 1 sec) during the operation. In this regard, if the data of the position and posture of the tool 44, 64 or 74 has been further acquired to learn the learning model LM in the learning cycle illustrated in FIG. 7, in this step S12, the processor 104 may acquire data of the position and posture of the tool 44, 64 or 74 upon detection of the force F by the force sensor 32, and store it in the storage 106 in association with the acquired data of the force F.

In addition, if the data of the speed V of the tool 44, 64 or 74 has been further acquired to learn the learning model LM in the learning cycle illustrated in FIG. 7, the speed sensor may detect a speed V (or a speed command CR) of the tool 44, 64 or 74 during execution of step S11, and the processor 104 may acquire data of the speed V from the speed sensor in this step S12.

In addition, if the data of the weight WG of the tool 44, 64 or 74 has been further acquired to learn the learning model LM in the learning cycle illustrated in FIG. 7, the processor 104 may acquire data of the weight WG of the tool 44, 64 or 74 from the weight sensor. In addition, if the data of the type of workpiece (or tool) has been further acquired to learn the learning model LM in the learning cycle illustrated in FIG. 7, the processor 104 may acquire the data of the type of workpiece (or tool) from the operator via the input device.

In step S13, the processor 104 determines the state S of the tool 44, 64 or 74, based on the learning model LM. More specifically, the processor 104 inputs the data of the force F acquired in step S12 to the learning model LM stored in the storage 106. In response, the learning model LM estimates and outputs the data indicating the state S (i.e., the label information such as the "normal state" or the "abnormal state"), which is correlated with the input data of the force F. The processor 104 can thus determine the state S of the tool 44, 64 or 74 from the acquired data of the force F.

If the learning model LM has been generated using the data of the position and posture of the tool 44, 64 or 74 as the learning data set DS, the processor 104 may input the data of the position and posture of the tool 44, 64 or 74 acquired in step S12 to the learning model LM, together with the data of the force F. In this case, the learning model LM estimates and outputs the data indicating the state S correlated with the data of the force F corresponding to the position and posture of the tool 44, 64 or 74.

In addition, if the learning model LM has been generated using the data of the speed V (or the speed command CR) or the weight WG of the tool 44, 64 or 74, or the type of workpiece (or tool) as the learning data set DS, the processor 104 may input the data of the speed V (or the speed command CR), the weight WG, or the type to the learning model LM acquired in step S12, together with the data of the force F. In this case, the learning model LM estimates and outputs the data indicating the state S in response to the data of the force F and the data of the speed V (or the speed command CR), the weight WG, or the type.

In this manner, by generating the learning model LM using a larger number of data in addition to the data of the force F, it is possible to determine the abnormality of the tool 44, 64 or 74 in the flow illustrated in FIG. 11 so as to correspond to a larger number of conditions (the position and posture, the speed V, the weight WG, and the type of workpiece or tool).

The processor 104 determines NO when the state S of the tool 44, 64 or 74 is not abnormal (or is normal), and ends the operation started in step S11 to end the flow illustrated in FIG. 11. On the other hand, the processor 104 determines YES when the state S of the tool 44, 64 or 74 is abnormal (or is not normal), and proceeds to step S15. Thus, in this embodiment, the processor 104 functions as a state determination section 110 (FIG. 10) configured to determine the state S of the tool 44, 64 or 74.

In step S15, the processor 104 detects whether or not a failure occurs in the force sensor 32. In this respect, if a failure occurs in the force sensor 32, the force sensor 32 cannot provide appropriate data of force F to the processor 104. In this case, the processor 104 may erroneously determine that the state S is abnormal (i.e., YES) in step S13 even when the state S of the tool 44, 64 or 74 is normal.

In order to distinguish between correct or incorrect of the determination of the state S, in this embodiment, the processor 104 executes this step S15. Specifically, the processor 104 stops the operation started in step S11, and arranges the tool 44, 64 or 74 (i.e., the end effector 40, 50, 60 or 70) at a predetermined position and posture.

Then, the processor 104 acquires from the force sensor 32 a force $F_0$ detected by the force sensor 32 at this time. The processor 104 determines whether or not the acquired force $F_0$ is different from a predetermined reference value $F_\alpha$. In this regard, a force, which is to be applied from the stopped tool 44, 64 or 74 to the robot 20 when the tool 44, 64 or 74 is arranged at the predetermined position and posture, can be estimated by e.g. measurement or simulation. Therefore, the thus estimated force can be pre-stored in the storage 106 as the reference value $F_\alpha$.

When the processor 104 determines that the acquired force $F_0$ is different from the reference value $F_\alpha$ (i.e., YES), it proceeds to step S17. On the other hand, when the processor 104 determines that the acquired force $F_0$ is substantially equal to the reference value $F_\alpha$ (i.e., NO), it proceeds to step S16. Note that, in this step S15, the processor 104 may determine YES when the difference between the force $F_0$ and the reference value $F_\alpha$ (i.e., $|F_0-F_\alpha|$) is larger than a predetermined threshold. Thus, in this embodiment, the processor 104 functions as a failure detector 112 (FIG. 10) configured to detects whether or not a failure occurs in the force sensor 32.

Note that the operator may preliminary provide a learning model LM3 representing a correlation between the position and posture of the tool 44, 64 or 74 and the state (a normal value or an abnormal value) of the force F detected by the force sensor 32. The processor 104 may input to the learning model LM3 the data of the position and posture of the tool 44, 64 or 74 when the tool 44, 64 or 74 is arranged at the predetermined position and posture in this step S15, as well as the force $F_0$ detected by the force sensor 32 at this time, and detect whether a failure occurs in the force sensor 32.

In addition, if the tool 44 or 64 is used, the force sensor 32 may detect a force $F_0'$ during the operation to rotate the tool 44 or 64 without contacting the tool 44 or 64 with the workpiece. A force, which is to be applied from the tool 44, 64 or 74 to the robot 20 while the tool 44 or 64 is rotated without contacting with the workpiece, can also be estimated by e.g. measurement or simulation. Therefore, the processor 104 may use the thus estimated force as a reference value $F_\alpha'$ to determine whether the force $F_\alpha'$ detected by the force sensor 32 is different from the reference value $F_\alpha'$ in this step S15.

In step S16, the processor 104 generates a first warning signal. For example, the processor 104 generates an audio or image signal indicating "Abnormality may have occurred in tool," and outputs it via a loudspeaker or a display (neither is illustrated) provided at the controller 102. The processor 104 then ends the flow illustrated in FIG. 11.

In step S17, the processor 104 generates a second warning signal. For example, the processor 104 generates an audio or image signal indicating "Abnormality may have occurred in force sensor," and outputs it via the loudspeaker or the display provided at the controller 102. The processor 104 then ends the flow illustrated in FIG. 11.

As described above, in this embodiment, the processor 104 determines the state S of the tool 44, 64 or 74 based on the learning model LM learned by the machine learning apparatus 10, while the robot 20 carries out the work using the tool 44, 64 or 74. According to this configuration, it is possible to automatically and accurately determined whether an abnormality has occurred in the tool 44, 64 or 74, from the data of the force F acquired during the work.

Further, in this embodiment, the processor 104 detects whether a failure occurs in the force sensor 32 when it determines that the state S of the tool 44, 64 or 74 is abnormal. According to this configuration, it is possible to prevent the operator from erroneously determining the state S of the tool 44, 64 or 74, along with specifying a failure of the force sensor 32.

Note that the function of the failure detector 112 can be omitted from the robot system 100. In this case, steps S15 and S17 are omitted from the flow illustrated in FIG. 11, and the processor 104 proceeds to step S16 when it determines YES in step S13. Further, the storage 106 of the robot system 100 may be provided as a device (e.g., an external memory, an external server, or a cloud) different from the controller 102.

In the above-described embodiment, the processor 104 carries out the process of determining whether a failure occurs in the force sensor 32 (step S15) when it determines YES in step S13. However, the processor 104 may carry out the process of a failure occurs in the force sensor 32 when it determines NO in step S13, and may proceed to step S17 when it determines that a failure occurs in the force sensor 32.

The force sensor 32 may be provided at any position in the robot 20. For example, the force sensor 32 may be provided at the base 22 of the robot 20. The force sensor 32 is not limited to the six-axis force sensor, but may be comprised of e.g. a plurality of torque sensors respectively provided at the servomotors built in the robot 20. In this case, each torque sensor detects a torque applied to the corresponding servomotor as a force F, and provides data of the force F to the learning data acquisition section 12.

Further, in the above-mentioned embodiments, the tools 44, 64 and 74 (the end effectors 40, 50, 60, and 70) for polishing, machining, and insertion works have been described. However, a tool (spot welding gun) for carrying out any other work (e.g., spot welding) may be attached to the robot 20. Further, the robot 20 is not limited to a vertical multi-articulated robot, but may be any type of robot, such as a horizontal multi-articulated robot or a parallel-link robot. Further, the robot 20 may be a robot of a ceiling hanging type or a wall hanging type.

Figure 10:
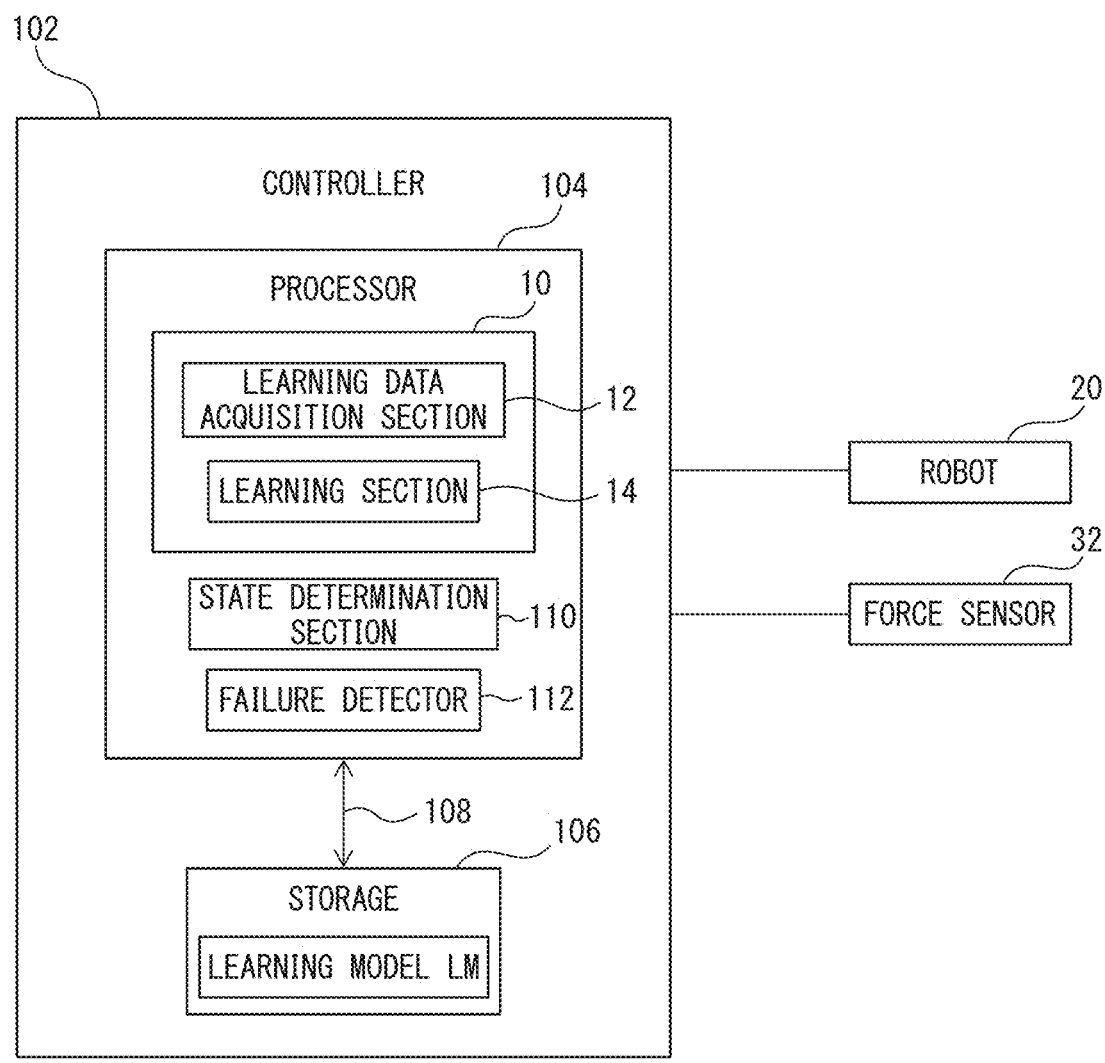
FIG. 10 is a block diagram illustrating a robot system according to one embodiment.

Further, in the embodiment illustrated in FIG. 10, the processor 104 of the controller 102 functions as the learning data acquisition section 12 and the learning section 14. However, the learning section 14 may be installed in a computer different from the controller 102, for example.

In this case, the different computer is communicably connected to the controller 102, and the processor 104 of the controller 102 transmits the learning data set DS acquired as the learning data acquisition section 12 to the different computer, wherein the learning section 14 generates the learning model 114 using the learning data set DS acquired from the controller 102. Alternatively, the machine learning apparatus 10 including the learning data acquisition section 12 and the learning section 14 may be installed in the different computer. In this case, the different computer functions as the learning data acquisition section 12 to acquire the data of the force F from the force sensor 32.

The disclosure has been described above with reference to the embodiments, but the above-described embodiments are not intended to limit the invention according to the scope of claims.

The invention claimed is:

1. A machine learning apparatus configured to learn a state of a tool used for a work by a robot, the apparatus comprising:
    a learning data acquisition section configured to acquire, as a learning data set,
        data of a force applied from the tool to the robot while the robot causes the tool to perform a predetermined operation, and
        label information indicating whether the state of the tool during the predetermined operation is an abnormal state in which the tool has damage or a normal state in which the tool has no damage;

a learning section configured to generate a first learning model representing a correlation between the force and the state of the tool, using the learning data set; and a second learning model representing a correlation between image data of the tool and the abnormal state or the normal state of the tool, wherein the second learning model is configured to receive an input of the image data captured when the predetermined operation is performed, and output to the learning data acquisition section the label information corresponding to the input image data.

2. The machine learning apparatus according to claim 1, wherein the learning data acquisition section is configured to further acquire, as the learning data set, data of a position and posture of the tool during the predetermined operation, wherein the learning section is configured to generate the first learning model by adding to the correlation a relationship between the force and the position and posture.

3. The machine learning apparatus according to claim 1, wherein the tool is a polishing material for polishing a workpiece by a rotation operation, wherein the predetermined operation is:
an operation to rotate the polishing material without contacting the polishing material with the workpiece; or
an operation to rotate the polishing material along with contacting the polishing material with the workpiece.

4. The machine learning apparatus according to claim 1, wherein the tool has a known life period in which the state changes with time, wherein the learning section is configured to generate the first learning model for each of a plurality of sub-periods included in the life period.

5. The machine learning apparatus according to claim 1, wherein the tool is a workpiece handled by the robot, wherein the predetermined operation is an operation to insert the workpiece into a hole.

6. The machine learning apparatus according to claim 1, wherein the learning data acquisition section acquires the data of the force while the robot carries out force control for controlling the force.

7. The machine learning apparatus according to claim 1, wherein the data of the force includes at least one of a time-change characteristics of the force, an amplitude value of the force, and a frequency spectrum of the force.

8. A robot system comprising:
a robot configured to carry out a work using a tool;
the machine learning apparatus according to claim 1;
a force sensor configured to detect the force and provide it to the learning data acquisition section as the data of the force; and
a state determination section configured to determine the state of the tool while the robot performs the predetermined operation in the work, based on the first learning model generated by the learning section.

9. The robot system according to claim 8, further comprising a failure detector configured to detect whether or not a failure occurs in the force sensor.

10. The machine learning apparatus according to claim 1, wherein in response to a determination based on the first learning model that the state of the tool is abnormal, a current operation of the robot is stopped and it is determined whether or not a failure occurs in a force sensor configured to detect the force.

11. The machine learning apparatus according to claim 1, wherein the data of the force includes a magnitude and a direction of the force applied from the tool to the robot, and
the magnitude and the direction of the force are obtained by detecting forces in directions of axes of a force sensor coordinate system set for a force sensor configured to detect the force and moments about the axes, the forces in the directions of the axes and the moments about the axes being detected based on output signals of strain gauges provided in the force sensor.

12. The machine learning apparatus according to claim 1, wherein the learning data acquisition section is configured to further acquire, as the learning data set, data of a type of a workpiece to be worked by the tool, and
the learning section is configured to generate the first learning model by adding a relationship between the force and the type of the workpiece.

13. The machine learning apparatus according to claim 1, wherein the tool has a known life period in which the state changes with time, and
the learning section is configured to:
generate a learning model, using the learning data set acquired within a first sub-period included in the life period, and
generate a different learning model, using the learning data set acquired within a second sub-period included in the life period and after the first subperiod.

14. A machine learning method of learning a state of a tool used for a work by a robot, the method comprising, by a processor:

acquiring, as a learning data set,
data of a force applied from the tool to the robot while the robot causes the tool to perform a predetermined operation, and
label information indicating whether the state of the tool during the predetermined operation is an abnormal state in which the tool has damage or a normal state in which the tool has no damage;
generating a first learning model representing a correlation between the force and the state of the tool, using the learning data set; and
controlling the operation of the robot in response to a result of determination for the state of the tool based on the generated first learning model,
wherein a second learning model representing a correlation between image data of the tool and the abnormal state or the normal state of the tool receives an input of the image data captured when the predetermined operation is performed, and outputs the label information corresponding to the input image data.

* * * * *